United States Patent
Liao

(10) Patent No.: US 8,026,993 B2
(45) Date of Patent: *Sep. 27, 2011

(54) DISPLAY PANEL HAVING REPAIR LINES AND SIGNAL LINES DISPOSED AT DIFFERENT SUBSTRATES

(75) Inventor: Chi-Nan Liao, Tao-Yuan Hsien (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/951,062

(22) Filed: Nov. 21, 2010

(65) Prior Publication Data

US 2011/0063539 A1 Mar. 17, 2011

Related U.S. Application Data

(62) Division of application No. 11/626,384, filed on Jan. 24, 2007, now Pat. No. 7,894,011.

(30) Foreign Application Priority Data

Mar. 15, 2006 (TW) ................................ 95108819 A

(51) Int. Cl.
*G02F 1/1333* (2006.01)

(52) U.S. Cl. ........................................................ 349/54

(58) Field of Classification Search ........................ None
See application file for complete search history.

(56) References Cited

U.S. PATENT DOCUMENTS

| 5,113,273 | A | 5/1992 | Mochizuki |
|---|---|---|---|
| 5,278,682 | A | 1/1994 | Niki |
| 2001/0028418 | A1 | 10/2001 | Ozaki |
| 2003/0025846 | A1 | 2/2003 | Murakami |
| 2004/0012727 | A1 | 1/2004 | Kim |
| 2005/0263772 | A1 | 12/2005 | Park |
| 2007/0007520 | A1 | 1/2007 | Seo |

FOREIGN PATENT DOCUMENTS

| JP | S58189615 A | 11/1983 |
|---|---|---|
| JP | 10268354 | 10/1998 |
| JP | H11202364 A | 7/1999 |
| KR | 19950003864 A | 2/1995 |
| KR | 19990081020 A | 11/1999 |
| KR | 20010017528 A | 3/2001 |
| KR | 100356830 | 5/2003 |
| KR | 1020040061601 A | 7/2004 |
| KR | 1020040071931 | 8/2004 |
| KR | 1020040091919 | 11/2004 |
| TW | 293952 | 12/1996 |
| TW | 413955 | 12/2000 |
| TW | 507189 | 10/2002 |
| TW | 573200 | 1/2004 |
| TW | I237301 | 8/2005 |

*Primary Examiner* — Lucy Chien

(74) *Attorney, Agent, or Firm* — Winston Hsu; Scott Margo

(57) ABSTRACT

A liquid crystal display panel includes a repair line for substituting open-circuited signal lines. Signal lines are disposed over a first side of a first substrate of the liquid crystal display panel for data transmission. Repair lines are disposed over a first side of a second substrate of the liquid crystal display panel for substituting open-circuited signal lines. The first side of the first substrate faces the first side of the second substrate. A liquid crystal layer is disposed between the first and second substrates of the liquid crystal panel.

17 Claims, 10 Drawing Sheets

DISPLAY PANEL HAVING REPAIR LINES AND SIGNAL LINES DISPOSED AT DIFFERENT SUBSTRATES

CROSS REFERENCE TO RELATED APPLICATIONS

This application is a continuation of U.S. patent application Ser. No. 11/626,384, filed Jan. 24, 2007 and incorporated herein in their entirety by reference.

BACKGROUND OF THE INVENTION

1. Field of the Invention

The present invention relates to a display panel, and more particularly, to a liquid crystal display (LCD) panel having a plurality of repair lines and signal lines disposed at different substrates.

2. Description of the Prior Art

Liquid crystal displays (LCDs) have advantages over certain other displays, including advantages of portability, low power consumption, and low radiation emissions. The LCDs have been widely used in various portable information products, such as notebooks, personal digital assistants (PDAs), video cameras, and other similar devices. Furthermore, CRT monitors are being replaced by the LCD.

A general architecture of the LCD panel includes a thin-film transistor (TFT) substrate, a color filter (CF) substrate, and a liquid crystal layer between the two substrates. The TFT substrate includes a pixel matrix composed by a plurality of data lines and a plurality of scan lines. The pixel matrix of the TFT substrate, formed by the plurality of data lines and the plurality of scan lines, includes a pixel driver IC formed by electrical components such as a TFT and a capacitor installed at each intersection of each data line and each scan line. The pixel driver IC can receive a video data signal transmitted from the data line and a switch/address signal transmitted from the scan line to control operation of the corresponding pixel. In order to prevent an open circuit in the signal transmission of the data line or the scan line, in manufacturing the LCD panel, a plurality of repair lines is usually disposed in a peripheral area of the panel so that when an open circuit occurs in the transmission of external video data signals or the switch/address signal, the signals can still be transmitted to the LCD panel via the repair line for controlling the pixel operation such that poor display quality of the LCD panel due to the open circuit of the data line or scan line can be prevented.

FIG. 1 illustrates a top view diagram of a TFT substrate of a conventional LCD panel 10. The TFT substrate of the LCD panel 10 includes a plurality of parallel data lines D1-Dm and a plurality of parallel scan lines S1-Sn disposed in a display area 20. The data lines D1-Dm and the scan lines S1-Sn are intersecting and form a pixel matrix 12. Each pixel and corresponding pixel driver IC formed by electrical components such as TFTs and capacitors is represented as a dot in FIG. 1. A source driver IC and a gate driver IC are packaged in a tape carrier package (TCP) manner and are represented as TCPs 24 and 26 of FIG. 1. The data lines D1-Dm can be coupled to a printed wiring board (PWB) 14 through the TCP 24 and can receive signals transmitted from the source driver IC, and the scan lines S1-Sn can be coupled to a PWB 16 through the TCP 26 and can receive signals transmitted from the gate driver IC. Repair lines T1-Ts of the LCD panel 10 can be disposed in an area outside of the display area 20 of the TFT substrate as a backup route for transmitting signals when an open circuit occurs in the data lines D1-Dm. Under normal circumstances, the repair lines T1-Ts and the data lines D1-Dm are not electrically connected.

FIG. 2 illustrates a resolution for a conventional LCD panel 10 when an open circuit occurs in a data line. If the open circuit occurs at a point A of the data line Dm (the open circuit is illustrated as "x" in FIG. 1), the conventional method utilizes a laser welding method to connect a point B and a point C of the data line Dm to two ends of the repair line T1. The connecting point of the data line Dm and the repair line T1 after the laser welding is illustrated as ▲ in FIG. 2, and the arrows in FIG. 2 represent the signal transmission route at this moment. The normal signal transmission route starts from point B and continues to point C of the data line Dm, however, if an open circuit occurs in the data line Dm, the signal will be transmitted from point B to point C of the data line through the repair line T1. In other words, the signal has to pass through the topside, left side, and bottom side of the display area 20 before transmission is completed. The resulting resistance value will be too high because the transmission route is too long. More specifically, a resistance: RC delay effect is easily generated with the liquid crystal layer, hence the success rate of repairing the open circuited line is reduced. Furthermore, this technique increases the power consumption of the LCD panel 10.

In the architecture of the conventional LCD panel 10, the data lines D1-Dm, the scan lines S1-Sn, and the repair lines T1-Ts are disposed on the TFT substrate. In order to avoid affecting the operation of the pixel, the repair lines T1-Ts must be disposed outside the display area 20, such that the lengths of the repair lines T1-Ts are longer than those of the data lines D1-Dm, making the transmission route provided by the repair lines T1-Ts too long, the resistance value too high, and the RC delay effect too easily generated with the liquid crystal layer, hence the success rate of repairing the open circuited line is lowered and the power consumption of the LCD panel 10 is increased. Furthermore, after the components, such as the data lines, the scan lines, and the driver ICs, are disposed on the TFT substrate, there is limited space left to dispose the repair lines. Therefore, the conventional LCD panel 10 can only provide a limited amount of space for repair lines and the repair capability is insufficient.

SUMMARY OF THE INVENTION

The present invention discloses a display panel having a plurality of repair lines and a plurality of signal lines formed at different substrates. The display panel comprises: a first substrate, a plurality of signal lines being formed over a first side of the first substrate for data transmission; a second substrate, a plurality of repair lines being formed over a first side of the second substrate, and the first side of the second substrate faces the first side of the first substrate; a plurality of first connecting wires formed over the first substrate, intersects with a first end of the corresponding signal lines, and coupled to a first end of the corresponding repair lines through an electrical conductive material; and a plurality of second connecting wires formed over the first substrate, intersects with a second end of the corresponding signal lines, and coupled to a second end of the repair lines through the electrical conductive material.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
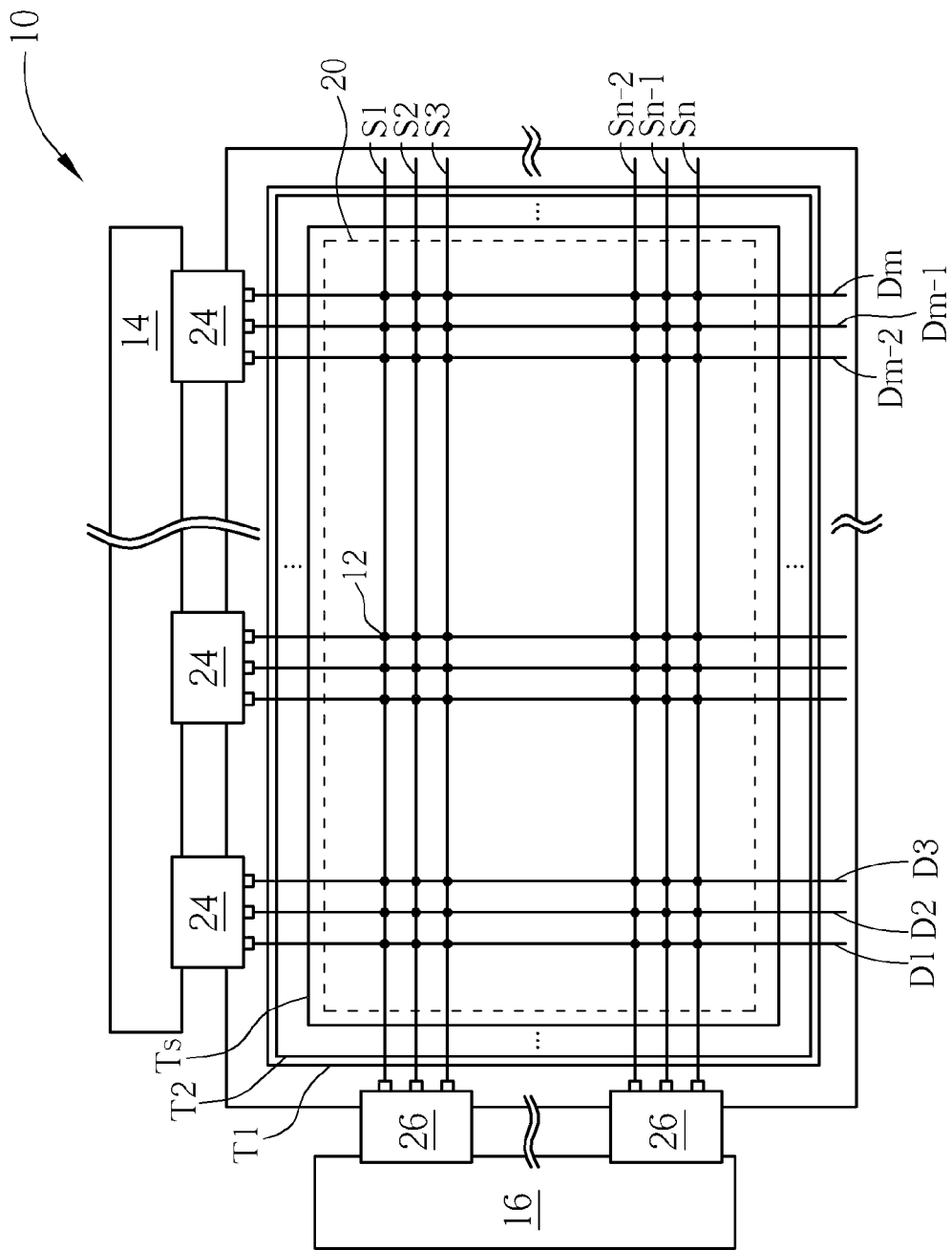
FIG. 1 illustrates a top view diagram of a TFT substrate according to a conventional LCD panel.
Figure 2:
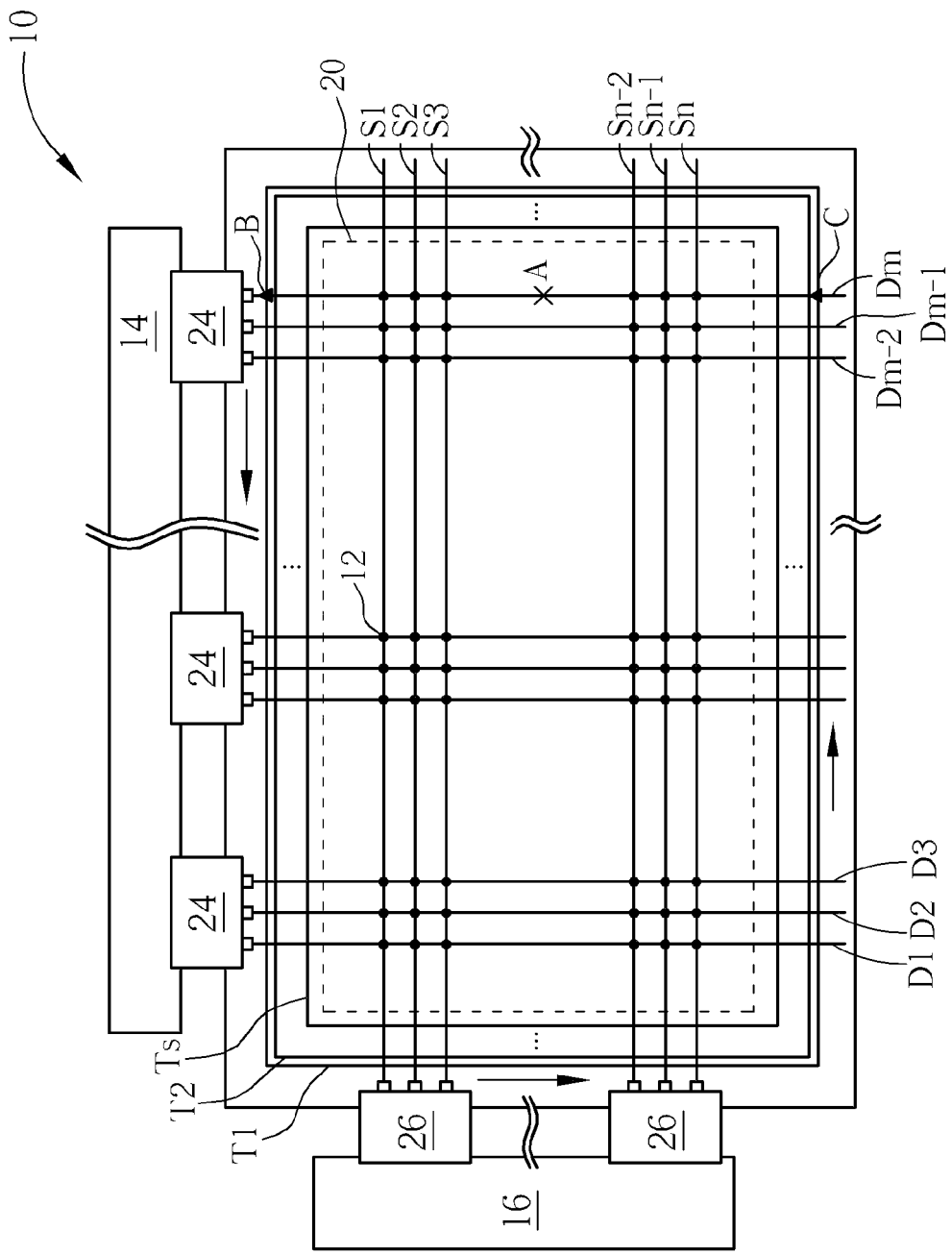
FIG. 2 illustrates a resolution for a conventional LCD panel when an open circuit occurs in a data line.
Figure 3:
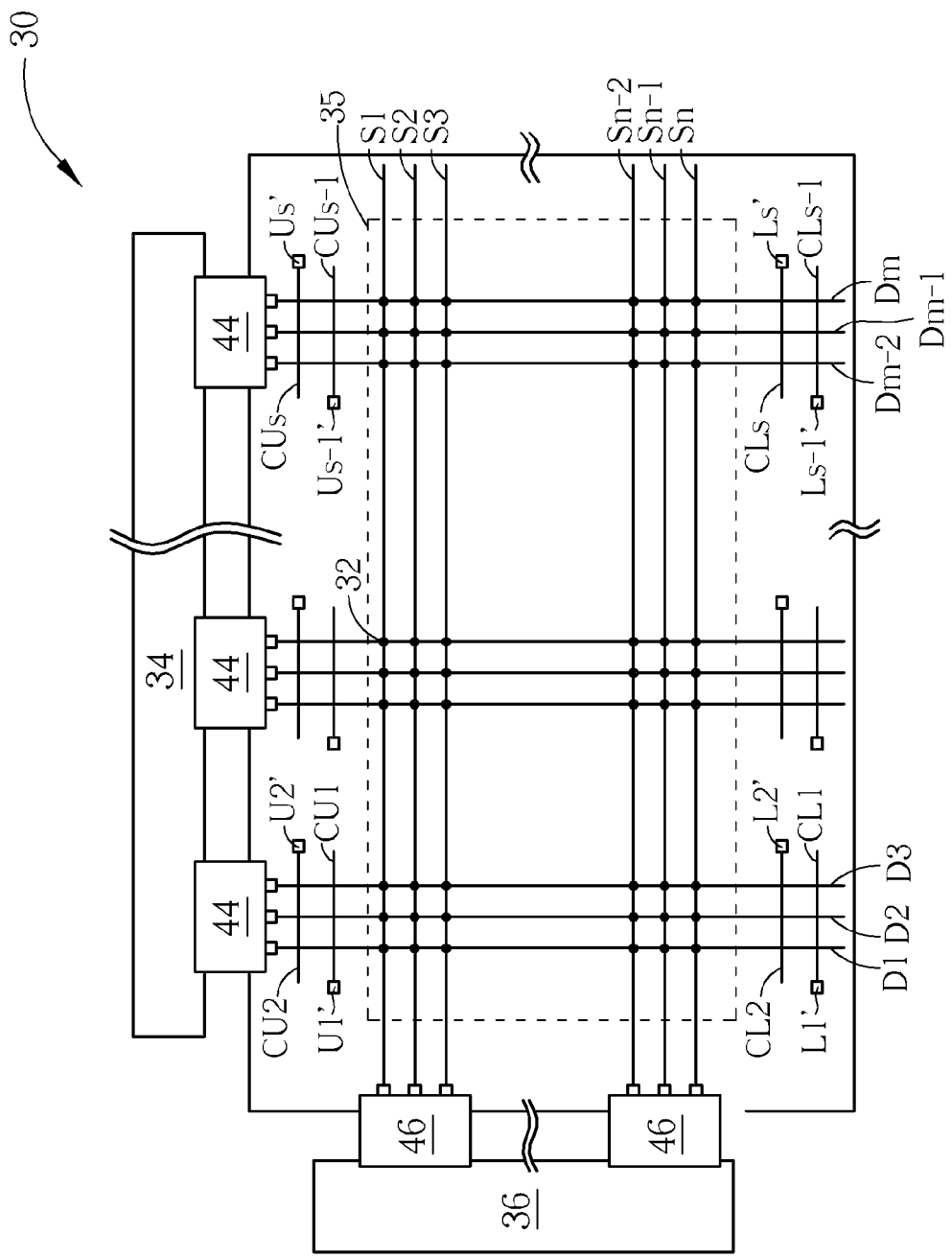
FIG. 3 illustrates a top view diagram of a TFT substrate of an LCD panel according to an embodiment of the present invention.
Figure 4:
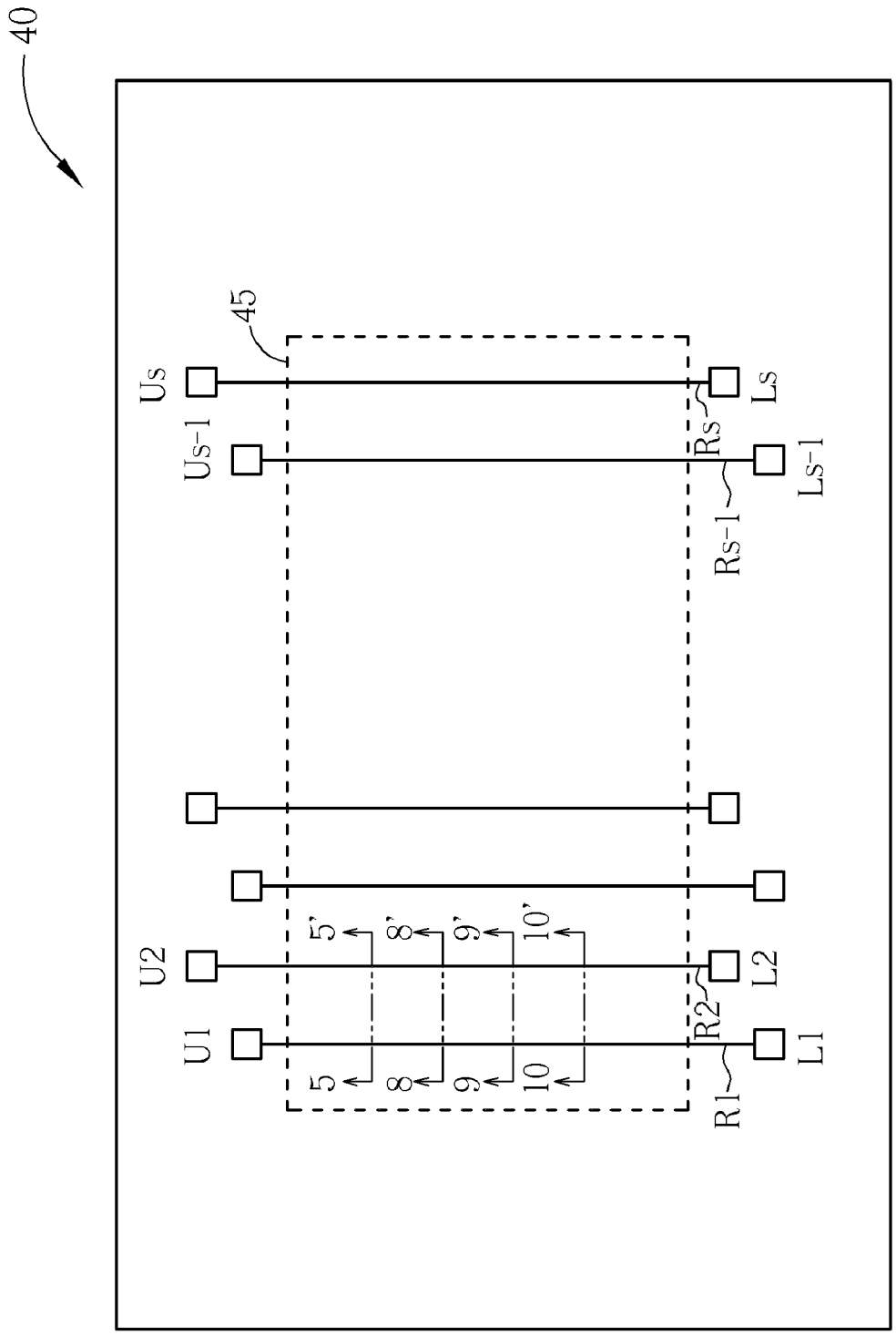
FIG. 4 illustrates a top view diagram of a color filter substrate of an LCD panel according to an embodiment of the present invention.

In one embodiment of the present invention, a signal line of an LCD panel is disposed on a TFT substrate, and a repair line of the LCD panel is disposed on a color filter substrate. FIG. 3 illustrates a top view diagram of a TFT substrate 30 of an LCD panel 50 according to the present invention. FIG. 4 illustrates a top view diagram of a color filter substrate 40 of an LCD panel 50 according to the present invention.

In FIG. 3, a plurality of parallel data lines D1-Dm and a plurality of parallel scan lines S1-Sn are disposed in a display area 35 of the TFT substrate 30. The data lines D1-Dm and the scan lines S1-Sn are intersecting and form a pixel matrix 32. Each pixel and corresponding pixel driver IC formed by electrical components such as TFTs and capacitors is represented as a dot in FIG. 3. A source driver IC and a gate driver IC of the LCD panel 50 are packaged in a tape carrier package (TCP) manner and are represented as TCPs 44 and 46 of FIG. 3. The data lines D1-Dm can be coupled to a printed wiring board (PWB) 34 through the TCP 44 and can receive signals transmitted from the source driver IC, and the scan lines S1-Sn can be coupled to a PWB 36 through the TCP 46 and can receive signals transmitted from the gate driver IC. Connecting wires CU1-CUs and CL1-CLs are respectively disposed at two ends of the display area 35 and are respectively intersecting at two ends of the corresponding data line. An end of the connecting wires CU1-CUs respectively includes pads U1'-Us', and an end of the connecting wires CL1-CLs respectively includes pads L1'-Ls'. Under normal circumstances, the connecting wires CU1-CUs and CL1-CLs and the data lines D1-Dm are not electrically connected.

In FIG. 4, repair lines R1-Rs of the LCD panel 50 are disposed on the color filter substrate 40. As the surface of the TFT substrate 30 is disposed opposite to the surface of the color filter substrate 40, an area 45 of the color filter substrate 40 corresponds to the display area 35 of the TFT substrate 30. Two ends of the repair lines R1-Rs include pads U1-Us and L1-Ls, respectively. The pads U1-Us and L1-Ls are respectively disposed at locations corresponding to the pads U1'-Us' and L1'-Ls'.

Figure 5:
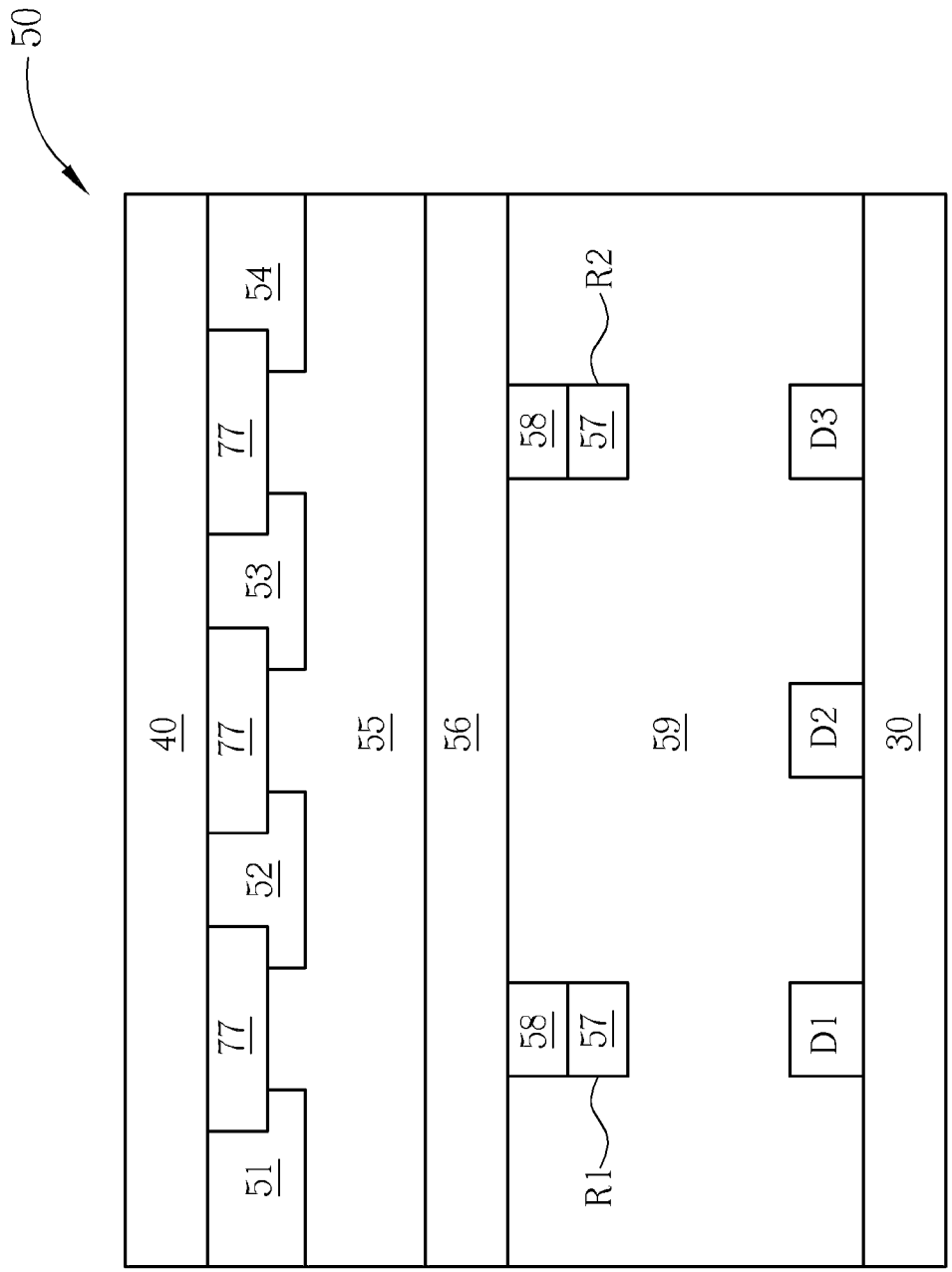
FIG. 5 illustrates a cross-sectional diagram of a color filter substrate of an LCD panel along a sectional 5-5' direction, according to the present invention.

A black matrix, a plurality of color filters (CFs), and a counter electrode of a transparent electrically conductive layer are also disposed on the color filter substrate 40. FIG. 5 illustrates a cross-sectional diagram of a color filter substrate 40 of the LCD panel 50 along a sectional 5-5'. The color filter substrate 40 shown in FIG. 5 includes color filters 51-54, a black matrix 77, a flat layer 55, a transparent electrically conductive layer 56, and repair lines R1-R2, and the TFT substrate 30 includes data lines D1-D3. A liquid crystal layer 59 is interposed between the TFT substrate 30 and the color filter substrate 40. As the surface of the TFT substrate 30 is opposite to the surface of the color filter substrate 40, the order sequence of each layer of color filter substrate 40 as illustrated in FIG. 5 is opposite to the forming sequence of each layer of color filter substrate 40, as this is presented in a different manner, the black matrix 77 in the figure can be located either on the top or the bottom of the color filter substrate. While only the top side is used for explanation herein, this is not a limitation of the present invention.

In the embodiment of FIG. 5, the color filters 51-54 can be red, green, or blue color filters disposed over the top of the color filter substrate 40 corresponding to a position between the data lines D1, D2, and D3. The black matrix 77 is installed between each color filter for blocking interference between different color lights such as red, green, and blue, and also for preventing any light leakage when the user views at an angle. The flat layer 55 is formed over the color filters 51-54 and the black matrix 77 to provide a flat surface for subsequent processes. The transparent electrically conductive layer 56 is utilized as a counter electrode of the LCD panel 50 which can be made of indium zinc oxide (IZO) or indium tin oxide (ITO). The repair lines R1 and R2 each include a conductive layer 57 and an insulating layer 58 disposed at a position corresponding to the black matrix 77.

Figure 6:
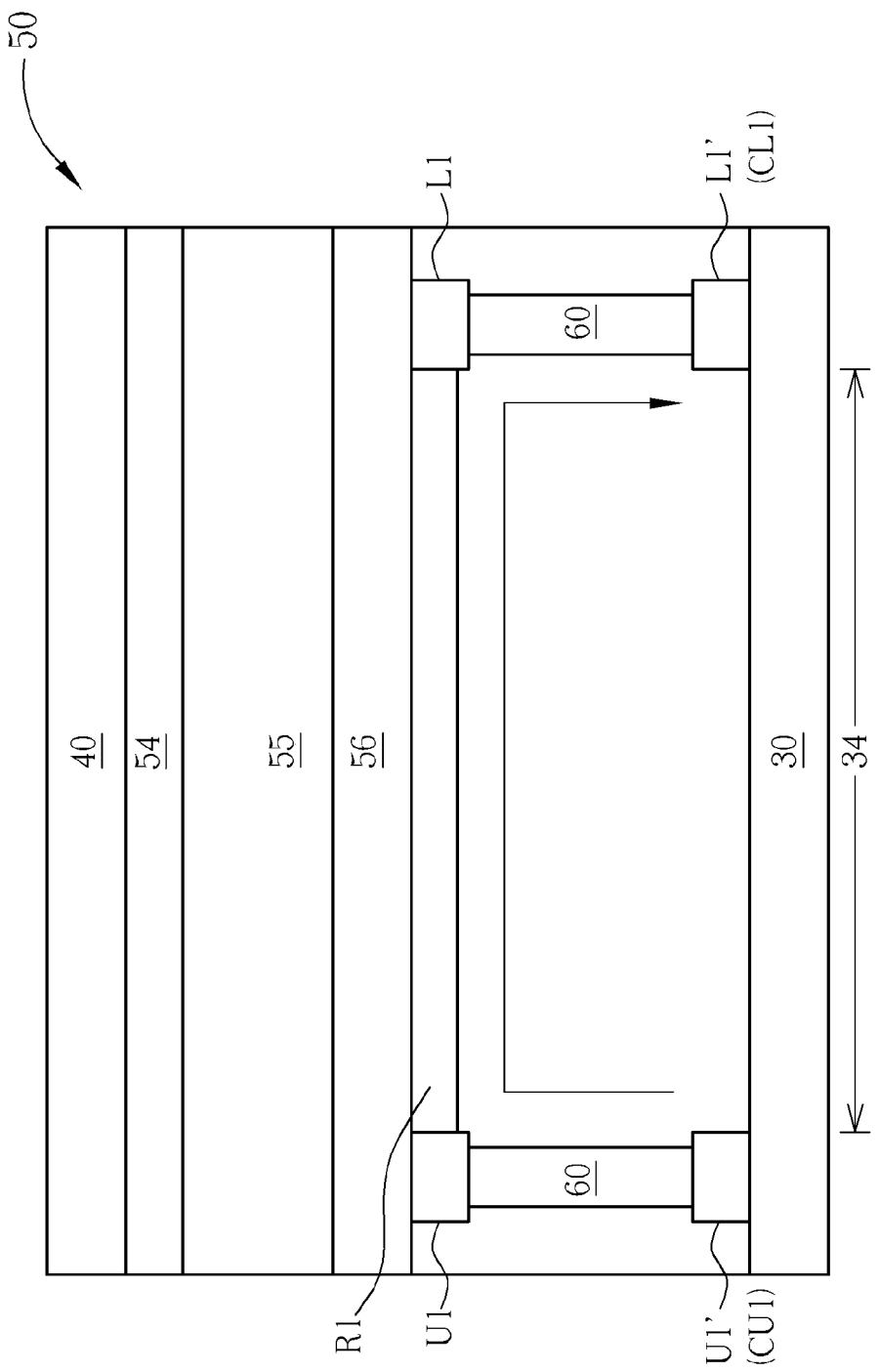
FIG. 6 illustrates a cross-sectional diagram of the LCD panel along direction of the repair line R1, according to an embodiment of the present invention.

Next, in the following, a connecting method of the connecting wires CU1-CUs and CL1-CLs with the repair lines R1-Rs is explained. FIG. 6 illustrates a cross-sectional diagram of the LCD panel 50 along direction of the repair line R1. The pads U1 and L1 at two ends of the repair line R1 are respectively coupled to the pads U1 and L1 of the TFT substrate 30 through a electrically conductive material 60 (such as a silver glue) such that the repair line R1 and the connecting wires CU1 and CL1 can be electrically connected.

Figure 7:
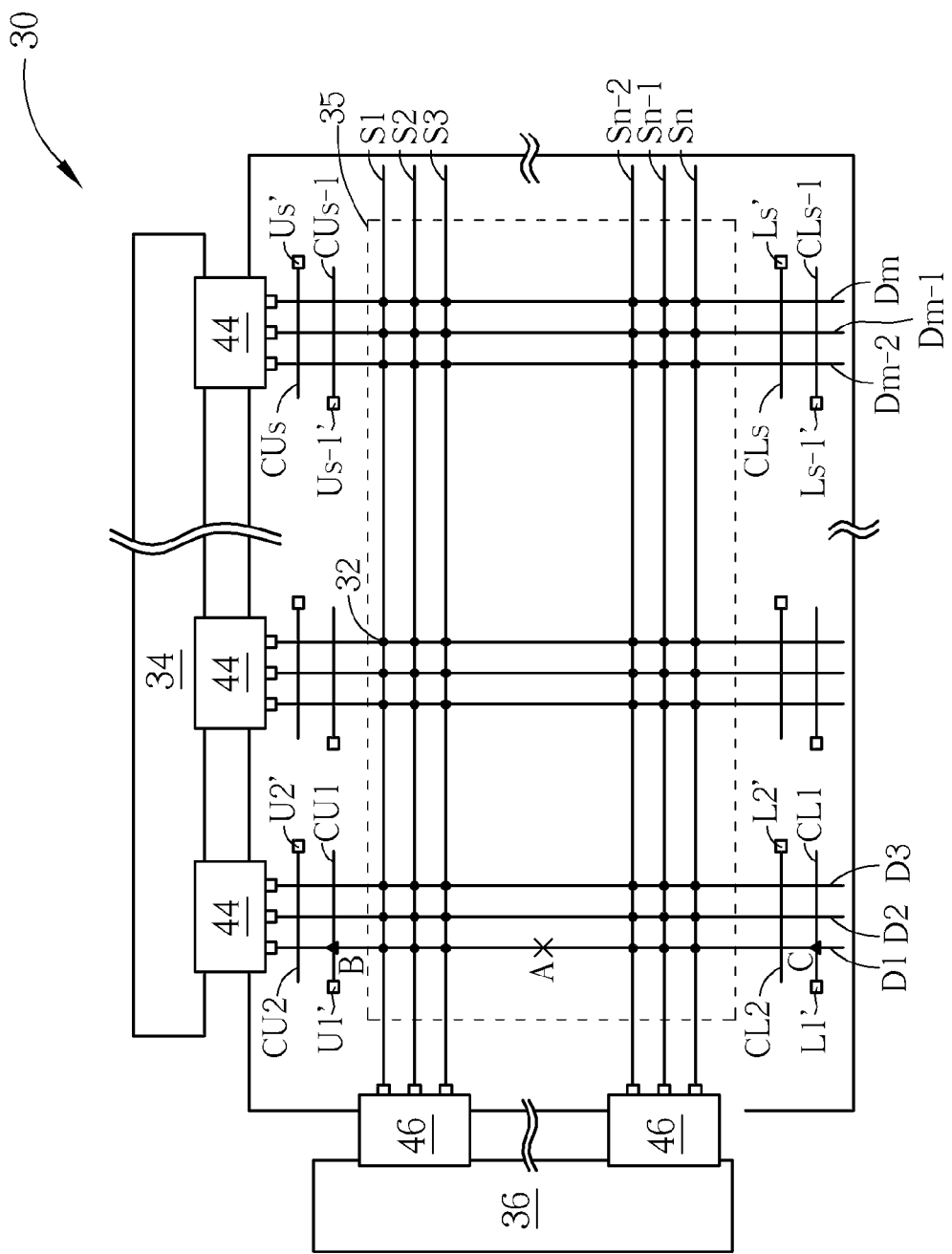
FIG. 7 illustrates a resolution for an LCD panel when an open circuit occurs in a data line, according to an embodiment of the present invention.

FIG. 7 illustrates a resolution for the LCD panel 50 when an open circuit occurs in a data line. If the open circuit occurs at point A of the data line D1 (the open circuit is illustrated as "x" in FIG. 7), the method can utilize a laser welding method to respectively connect point B and point C of the data line D1 to the conducting wires CU1 and CL1. The connecting point of the data line D1 and the conducting wires CU1 and CL1 is represented as "▲" in FIG. 7. At this time, signals are being transmitted from an end of the data line D1 to the repair line R1 through the pad U1', the electrically conductive material 60 and the pad U1, and then the signals are transmitted to the other end of the data line D1 through the pad L1', the electrically conductive material 60 and the pad L1. The arrows of FIG. 6 represent the signal transmission route at the moment of time. Since the repair lines R1-Rs of the present invention are disposed over the color filter substrate 40 instead of over the TFT substrate 30 like the data lines D1-Dm, it is not required to dispose the repair lines R1-Rs in order to avoid the data lines D1-Dm and other components as in the conventional method. Thus, the length of the repair lines R1-Rs are identical to that of the data lines D1-Dm. When there is an open circuit in the data line, a low resistance value transmission route can be provided to effectively lower the RC delay effect and power consumption of the LCD panel 50.

Figure 8:
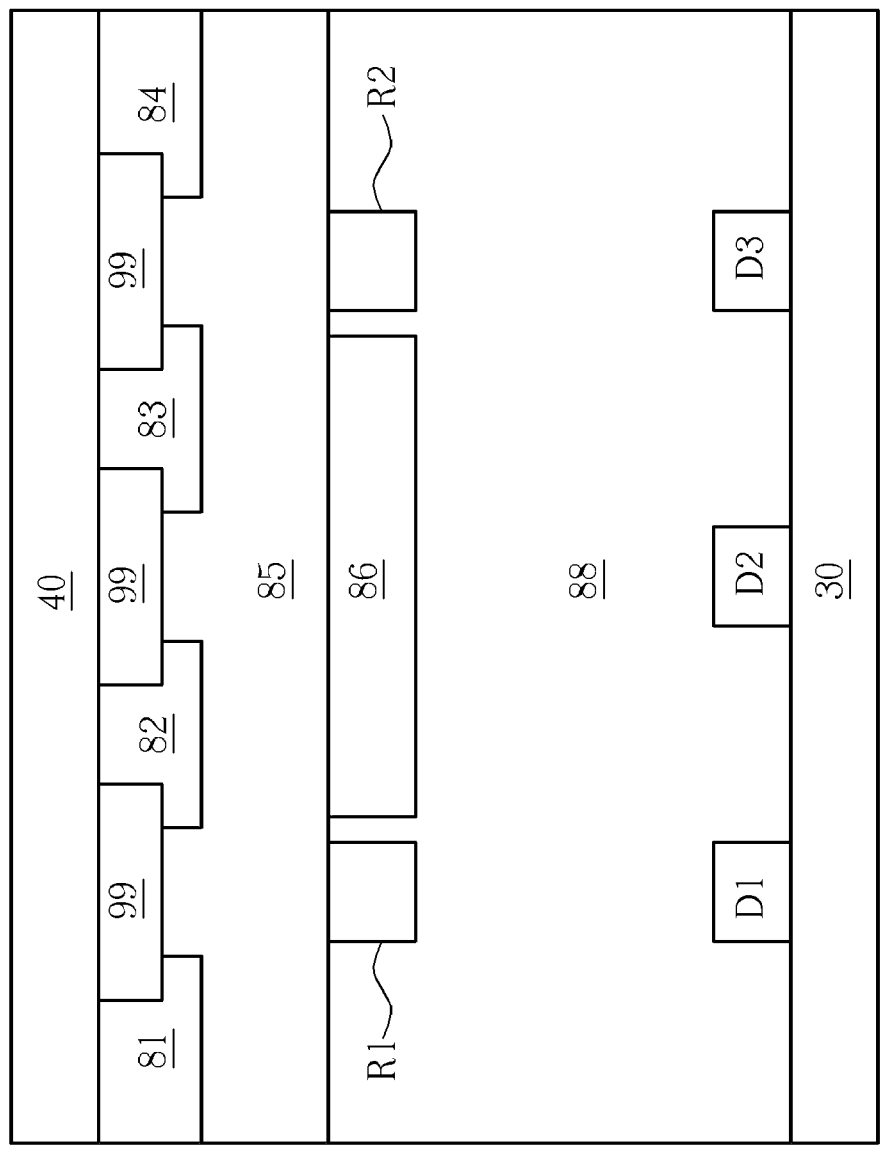
FIG. 8 illustrates a cross-sectional diagram of the color filter substrate of the LCD panel along the sectional 8-8' direction, according to an embodiment of the present invention.

FIG. 8 illustrates a diagram of an embodiment of the present invention. FIG. 8 can also illustrate a cross-sectional diagram of the color filter substrate 40 of the LCD panel 50 along the sectional 8-8' direction. In FIG. 8, color filters 81-84 can be red, green, or blue color filters disposed over corresponding positions between data lines D1, D2, and D3. A black matrix 99 is formed between each color filter for blocking interference between different color lights, such as red, green, and blue, and also for preventing any light leakage when the user views at an angle. A flat layer 85 is formed over the color filters 81-84 and the black matrix 99 to provide a flat surface for subsequent processes. A transparent electrically conductive layer 86 is utilized as a counter electrode of the LCD panel 50 which can be made of indium zinc oxide (IZO) or indium tin oxide (ITO). In the embodiment of FIG. 5, the repair lines R1 and R2 are further formed on the transparent electrically conductive layer 56. In the embodiment of FIG. 8, the repair lines R1 and R2 are manufactured in an etching process and can be defined by directly corresponding to a position of the black matrix layer 99 on the transparent electrically conductive layer 86.

In the above-mentioned embodiment, the repair lines are formed on the transparent electrically conductive layer 56 and correspond to position of the black matrix layer 77, or the repair lines can be defined by directly corresponding to the position of the black matrix layer 99. As the black matrix layers 77 and 99 are utilized for blocking light, therefore installation of the repair lines of the present invention will not affect an opening rate of the LCD panel 50. However, the present invention is not limited to the structure formed by disposing the repair lines corresponding to the position of the black matrix, as long as the repair lines are disposed on the color filter substrate to substitute the open circuited data line of the TFT substrate of the LCD panel, which falls within the metes and bounds of the present invention.

Figure 9:
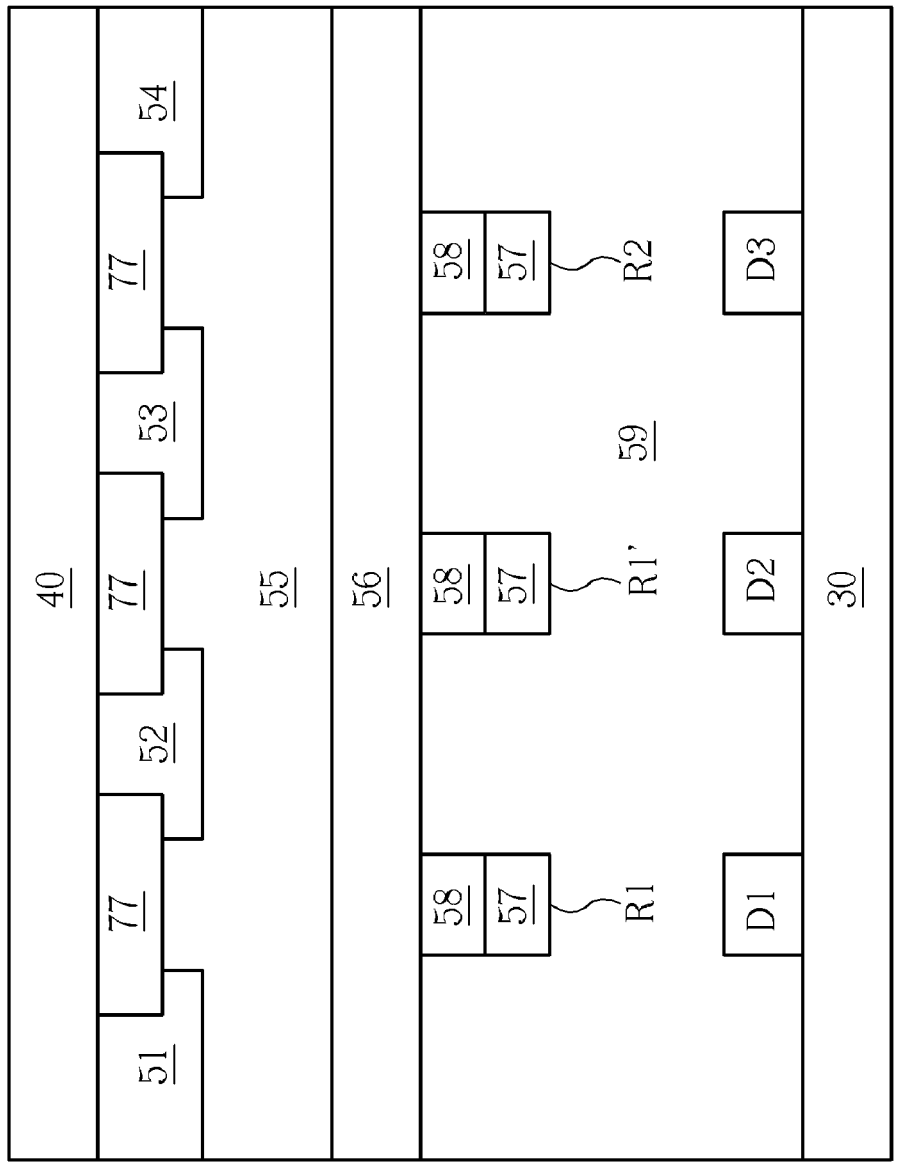
FIG. 9 illustrates a cross-sectional diagram of the color filter substrate of the LCD panel along the sectional 9-9' direction, according to an embodiment of the present invention.
Figure 10:
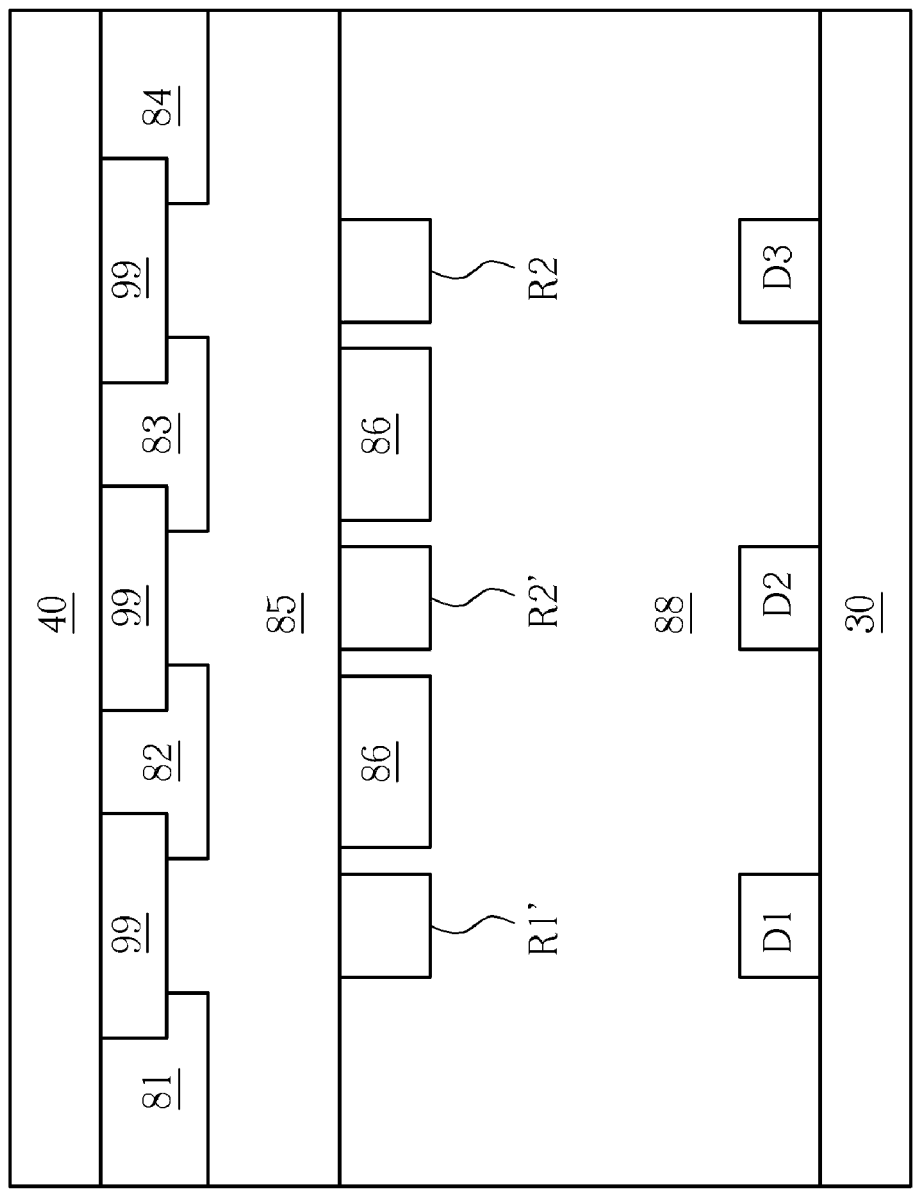
FIG. 10 illustrates a cross-sectional diagram of the color filter substrate of the LCD panel along the sectional 10-10' direction, according to an embodiment of the present invention.

In the embodiment of FIG. 5 and FIG. 8, in each set of data lines (such as data lines D1-D3) only two repair lines are provided, however the present invention can also provide more sets of repair lines. In order to avoid affecting the opening rate as mentioned, a repair line can be disposed on the transparent electrically conductive layer 56 to correspond to a position of the black matrix layer 77, such as the repair lines R1, R1', and R2 illustrated in FIG. 9 (cross-section 9-9' of FIG. 4). Alternately, each repair line can be defined directly corresponding to the position of the black matrix layer 99 on the transparent electrically conductive layer 86, such as the repair lines R1, R2, and R2' shown in FIG. 10 (cross-section 10-10' of FIG. 4).

According to another embodiment of the present invention, the repair lines are disposed on the TFT substrate, and the data lines are disposed over a different substrate. Therefore, it is not necessary to avoid the data lines and other components when disposing the repairing lines as in the conventional method. Thus, the length of the repair line, according to one embodiment of the present invention, is identical to the length of the data line. When there is an open circuit in the data line, a low resistance transmission route can be provided to effectively lower the RC delay effect and power consumption of the LCD panel. Furthermore, with more available space on the TFT substrate, more repair lines can be provided to increase the repair ability without lowering the opening rate. In comparison to the prior art, the present invention provides an LCD panel with a low RC effect, low power consumption, and high repair ability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display panel comprising:
   a first substrate;
   a second substrate;
   a plurality of signal lines formed between a first side of the first substrate and a first side of a liquid crystal layer;
   a plurality of repair lines formed between a second side of the liquid crystal layer and a first side of the second substrate facing the first side of the first substrate;
   a first connecting wire formed over the first substrate, intersecting a first end of a corresponding signal line among the plurality of signal lines, and coupled to a first end of a corresponding repair line among the plurality of repair lines through an electrically conductive material; and
   a second connecting wire formed over the first substrate, intersecting a second end of the corresponding signal line, and coupled to a second end of the corresponding repair line through an electrically conductive material.

2. The display panel of claim 1, wherein the first and the second connecting wires are coupled to the corresponding signal line when the corresponding signal line has an open circuit.

3. The display panel of claim 1, wherein the first connecting wire is coupled to the first end of the corresponding repair line through an electrically conductive glue, and the second connecting wire is coupled to the second end of the corresponding repair line through an electrically conductive glue.

4. The display panel of claim 1, further comprising a first pad installed at an end of the first connecting wire, and a second pad installed at an end of the second connecting wire, wherein the first pad is coupled to the first end of the corresponding repair line through an electrically conductive material, and the second pad is coupled to the second end of the corresponding repair line through an electrically conductive material.

5. The display panel of claim 1, further comprising a first pad and a second pad formed at both ends of the corresponding repair line, wherein the first connecting wire is coupled to the first pad through an electrically conductive material, and the second connecting wire is coupled to the second pad through an electrically conductive material.

6. The display panel of claim 1, further comprising a first pad formed at one end of the first connecting wire, a second pad formed at one end of the second connecting wire, and a third pad and a fourth pad respectively formed at both ends of the corresponding repair line, wherein the first pad is coupled to the third pad through an electrically conductive material and the second pad is coupled to the fourth pad through an electrically conductive material.

7. The display panel of claim 1, wherein one of the plurality of signal lines comprises a scan line and a data line to form a pixel matrix.

8. The display panel of claim 7, further comprising a plurality of thin-film transistors disposed at each intersection of a scan line and a data line for controlling each pixel within the pixel matrix.

9. The display panel of claim 1, further comprising a plurality of color filters disposed over the first side of the second substrate, each color filter corresponding to a position between two adjacent signal lines.

10. The display panel of claim 9, further comprising a plurality of black matrix layers formed over the second substrate, each black matrix layer corresponding to a position between two adjacent color filters.

11. The display panel of claim 7, wherein the corresponding repair line is disposed so as to correspond to the corresponding data line.

12. The display panel of claim 1 further comprising a transparent electrically conductive layer formed over the first side of the second substrate utilized as a common electrode.

13. The display panel of claim 12, wherein the corresponding repair line is disposed over the transparent electrically conductive layer.

14. The display panel of claim 12, wherein the second substrate comprises a flat layer, and the transparent electrically conductive layer and the corresponding repair line is disposed over the flat layer.

15. The display panel of claim 12, wherein the transparent electrically conductive layer comprises indium zinc oxide or indium tin oxide.

16. The display panel of claim 12, wherein the corresponding repair line is at the same level as the transparent electrically conductive layer, and the corresponding repair line comprises indium zinc oxide or indium tin oxide.

17. The display panel of claim 1, wherein the first substrate is a thin film transistor substrate, and the second substrate is a color filter substrate.

* * * * *

UNITED STATES PATENT AND TRADEMARK OFFICE
CERTIFICATE OF CORRECTION

PATENT NO.        : 8,026,993 B2
APPLICATION NO.   : 12/951062
DATED             : September 27, 2011
INVENTOR(S)       : Chi-Nan Liao Page 1 of 1

It is certified that error appears in the above-identified patent and that said Letters Patent is hereby corrected as shown below:

On the Title page, item (63) correct the continuity type of the Related U.S. Application Data from "Division" to --Continuation--.

Signed and Sealed this
Third Day of January, 2012

David J. Kappos
*Director of the United States Patent and Trademark Office*